US006351548B1

United States Patent
Basu et al.

(10) Patent No.: US 6,351,548 B1
(45) Date of Patent: Feb. 26, 2002

(54) FAST HIERARCHICAL REPROJECTION ALGORITHM FOR TOMOGRAPHY

(75) Inventors: Samit Basu; Yoram Bresler, both of Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/539,073

(22) Filed: Mar. 30, 2000

Related U.S. Application Data

(63) Continuation-in-part of application No. 09/419,415, filed on Oct. 15, 1999, which is a continuation-in-part of application No. 09/338,092, filed on Jun. 23, 1999, which is a continuation-in-part of application No. 09/418,933, filed on Oct. 15, 1999, which is a continuation-in-part of application No. 09/338,677, filed on Jun. 23, 1999.

(51) Int. Cl.[7] .................................................. G06K 9/00
(52) U.S. Cl. ........................................ 382/128; 378/65
(58) Field of Search ................................ 382/128, 130, 382/19, 65; 378/4, 8

(56) References Cited

U.S. PATENT DOCUMENTS

| | | | |
|---|---|---|---|
| 4,042,811 A | 8/1977 | Brunnett et al. | 235/151.3 |
| 4,149,247 A | 4/1979 | Pavkovich et al. | 364/414 |
| 4,217,641 A | 8/1980 | Naparstek | 364/414 |
| 4,491,932 A | 1/1985 | Ruhman et al. | 364/900 |
| 4,616,318 A | 10/1986 | Crawford | 364/414 |
| 4,626,991 A | 12/1986 | Crawford et al. | 364/414 |
| 4,709,333 A | 11/1987 | Crawford | 364/414 |

(List continued on next page.)

OTHER PUBLICATIONS

Martin L. Brady; "A Fast Discrete Approximation Algorithm for the Radon Transform"; *SIAM J. Comput.* vol. 27, No. 1, pp. 107–119; Feb. 1998.

A. Brandt et al.; "Fast Calculation of Multiple Line Integrals"; *SIAM J. Sci. Comput.*, vol. 20, No. 4, pp. 1517–1429; 1999.

Achi Brandt et al.; "A Fast and Accurate Multilevel Inversion of the Radon Transform"; *SIAM J. Appl. Math.*, vol. 60, No. 2, pp. 437–462; 1999.

Carl R. Crawford; "Reprojection Using a Parallel Backprojector"; Elscint Ltd., P.O. Box 5258, Haifa, Israel; Mar. 12, 1986.

Carl R. Crawford et al.; "High Speed Reprojection and its Applications"; *SPIE* vol. 914 *Medical Imaging II*; 1988.

Per–Erik Danielsson et al.; Backprojection in $O(N^2 \log N)$ Time; *IEEE Medical Imaging Conference*, Albuquerque, NM; Nov. 12–15, 1997.

(List continued on next page.)

*Primary Examiner*—Joseph Mancuso
*Assistant Examiner*—Abolfazl Tabatabai
(74) *Attorney, Agent, or Firm*—Greer, Burns & Crain, Ltd.

(57) ABSTRACT

A method for reprojecting images into sinograms includes the steps of dividing a two-dimensional image into subimages as small as one pixel and reprojecting the sub-images at a smaller number of orientations to form subsinograms. These sub-sinograms are then successively aggregated and processed to form a full sinogram.

The method uses two algorithms to aggregate the subsinograms. In one algorithm, the aggregation is exact, and in the other algorithm, aggregation is an approximation. The first algorithm is accurate, but relatively slow, and the second algorithm is faster, but less accurate. By performing some aggregations with the exact algorithm and some aggregations with the approximate algorithm, switching between the two algorithms in one of a number of suitable ways, an accurate result can be obtained quickly.

19 Claims, 4 Drawing Sheets

U.S. PATENT DOCUMENTS

| | | | |
|---|---|---|---|
| 4,714,997 A | | 12/1987 | Crawford et al. ............ 364/414 |
| 4,718,010 A | * | 1/1988 | Fujii .............................. 378/5 |
| 4,858,128 A | | 8/1989 | Nowak ................... 364/413.13 |
| 4,930,076 A | | 5/1990 | Meckley ................ 364/413.21 |
| 4,991,093 A | | 2/1991 | Roberge et al. ......... 364/413.15 |
| 5,008,822 A | | 4/1991 | Brunnett et al. ........ 364/413.21 |
| 5,136,660 A | | 8/1992 | Flickner et al. ................ 382/46 |
| 5,224,037 A | | 6/1993 | Jones et al. ............. 364/413.19 |
| 5,229,934 A | | 7/1993 | Mattson et al. ......... 364/413.21 |
| 5,243,664 A | | 9/1993 | Tuy ............................... 382/6 |
| 5,253,308 A | * | 10/1993 | Johnson ...................... 382/304 |
| 5,300,782 A | | 4/1994 | Johnston et al. ........ 250/363.03 |
| 5,375,156 A | | 12/1994 | Kuo-Petravic et al. ......... 378/9 |
| 5,396,528 A | | 3/1995 | Hu et al. ....................... 378/14 |
| 5,438,602 A | | 8/1995 | Crawford et al. .............. 378/4 |
| 5,552,605 A | | 9/1996 | Arata ..................... 250/363.04 |
| 5,559,335 A | | 9/1996 | Zeng et al. ............. 250/363.04 |
| 5,579,358 A | | 11/1996 | Lin ................................ 378/4 |
| 5,625,190 A | | 4/1997 | Crandall ................ 250/363.03 |
| 5,654,820 A | | 8/1997 | Lu et al. ....................... 359/298 |
| 5,727,041 A | | 3/1998 | Hsieh ............................ 378/4 |
| 5,748,768 A | * | 5/1998 | Sivers et al. ................. 382/130 |
| 5,778,038 A | | 7/1998 | Brandt et al. .................. 378/4 |
| 5,796,803 A | | 8/1998 | Flohr et al. ................... 378/15 |
| 5,805,098 A | | 9/1998 | McCorkle .................... 342/25 |
| 5,825,031 A | * | 10/1998 | Wong et al. ................. 250/363 |
| 5,848,114 A | | 12/1998 | Kawai et al. ................... 378/4 |
| 5,862,198 A | | 1/1999 | Samarasekera et al. ........ 378/4 |
| 5,878,102 A | * | 3/1999 | Kalvin ........................... 378/4 |
| 5,901,196 A | * | 5/1999 | Sauer et al. .................... 378/4 |
| 6,026,142 A | * | 2/2000 | Gueziec .......................... 378/8 |
| 6,028,907 A | * | 2/2000 | Adler et al. .................... 378/4 |
| 6,108,007 A | | 8/2000 | Shochet ....................... 345/430 |

OTHER PUBLICATIONS

Alexander H. Delaney; "A Fast and Accurate Fourier Algorithm for Iterative Parallel–Beam Tomography"; *IEEE Transactions on Image Processing*, vol. 5, No. 5, pp. 740–753; May 1996.

E.C. Frey et al.; "A Fast Projector–Backprojector Pair Modeling the Asymmetric, Spatially Varying Scatter Response Function for Scatter Compensation in SPECT Imaging"; *IEEE Transactions on Nuclear Science*, vol. 40, No. 4, pp. 1192–1197; Aug. 1993.

Sung–Cheng Huang et al.; "Capability Evaluation of a Sinogram Error Detection and Correction Method in Computed Tomography"; *IEEE Transactions of Nuclear Science*, vol. 39, No. 4, pp. 1106–1110; 1992.

Eric Michielssen; "A Multilevel Matrix Decomposition Algorithm for Analyzing Scattering from Large Structures"; *IEEE Transactions on Antennas and Propagation*, vol. 44, No. 8, pp. 1086–1093; Aug. 1996.

John M. Ollinger; "Iterative Reconstruction–Reprojection and the Expectation–Maximization Algorithm"; *IEEE Transactions on Medical Imaging*, vol. 9, No. 1, pp. 94–98; Mar. 1990.

John M. Ollinger; "Reconstruction–Reprojection Processing of Transmission Scans and the Variance of PET Images"; *IEEE Transactions on Nuclear Science*, vol. 39, No. 4, pp. 1122–1125; 1992.

T.M. Peters; "Algorithms for Fast Back–and–Re–Projection in Computed Tomography"; *IEEE Transactions on Nuclear Science*, vol. NS–28, No. 4, pp. 3641–3646; Aug. 1981.

Jorge L.C. Sanz; "Computing Projections of Digital Images in Image Processing Pipeline Architectures"; *IEEE Transactions on Acoustics, Speech, and Signal Processing*, vol. ASSP–35, No. 2, pp. 198–207; Feb. 1987.

Herman Schomberg et al.; "The Gridding Method for Image Reconstruction by Fourier Transformation"; *IEEE Transactions on Medical Imaging*, vol. 14, No. 3, pp. 596–607; Sep. 1995.

Dan–Chu Yu et al.; "Study of Reprojection Methods in Terms of Their Resolution Loss and Sampling Errors"; *IEEE Transactions on Nuclear Science*, vol. 40, No. 4, pp. 1174–1178; Aug. 1993.

G.L. Zeng; "A Rotating and Warping Projector/Backprojector for Fan–Beam and Cone–Beam Iterative Algorithm"; *IEEE Transactions on Nuclear Science*, vol. 41, No. 6, pp. 2807–2811; Dec. 1994.

Gary H. Glover et al.; "An Algorithm for the Reduction of Metal Clip Artifacts in CT Reconstructions"; *Medical Physics*, vol. 8, No. 6, pp. 799–807; Nov./Dec. 1981.

McCorkle et al.; "An Order $N^2\log(N)$ Backprojector algorithm for Fovusing Wide–Angle Wide–bandwidth Arbitrary –motion Synthetic Aperture Radar"; *SPIE* vol. 2747, pp. 25–36; 1996.

Cobb et al; "Real–time Image Formation Effort Using Quadtree Backprojection and Reconfigurable Processing"; *Third Annual Federated Laboratory Symposium on Advanced Sensors*; pp. 133–137; Feb. 2–4, 1999.

Oh et al.; "Multi–resolution Mixed–radix Quadtree SAR Image Focusing Algorithms"; *Third Annual Federated Laboratory Symposium on Advanced Sensors*; pp. 139–143; Feb. 2–4, 1999.

Stephan Nilsson; Fast Backprojection; *Dept. Of Electrical Eng. Linkopings universitet, Sweden*, pp. 1–8; Jul. 4, 1996.

Per–Erik Danielsson; Interactive Techniques for Projection and Back Projection; *Dept. Of Electrical Eng., Linkopings universitet, Sweden*, pp. 1–28, Jun. 10, 1997.

Stephan Nilsson; Application to fast backprojection techniques for some inverse problems of ingeral geometry; *Dept. Of Mathematics., Linkopings universitet, Sweden*, pp. 1–99; Jun. 19, 1997.

\* cited by examiner

FAST HIERARCHICAL REPROJECTION ALGORITHM FOR TOMOGRAPHY This is a continuation-in-part of Ser. No. 09/419,415, filed Oct. 15, 1999, which is a continuation-in-part of Ser. No. 09/338,092, filed Jun. 23, 1999. This is also a continuation-in-part of Ser. No. 09/418,933, filed Oct. 15, 1999, which is a continuation-in-part of Ser. No. 09/338,677, filed Jun. 23, 1999. All of the parent applications are incorporated by reference in their entirety.

FIELD OF THE INVENTION

This invention relates to imaging, and more particularly, to the high speed reprojection of tomographic images.

BACKGROUND OF THE INVENTION

Tomographic images are created from line integral measurements of an unknown object at a variety of orientations. These line integral measurements, which may represent measurements of density, reflectivity, etc., are then processed to yield an image that represents the unknown object. Data generated in this manner is collected into a sinogram, and the sinogram is processed and backprojected to create the image. Tomographic reconstruction is the technique underlying nearly all of the key diagnostic S imaging modalities including X-ray Computed Tomography (CT), Positron Emission Tomography (PET), Single Photon Emission Count Tomography (SPECT), certain acquisition methods for Magnetic Resonance Imaging (MRI), and newly emerging techniques such as electrical impedance tomography (EIT) and optical tomography, The process of reprojection simulates a tomographic data acquisition system. Reprojection is generally used in two contexts. The first is in artifact correction. Here, reprojection is used to simulate the data acquisition procedure on a candidate reconstructed image. Differences between the reprojected image and the measured data can then be used to correct for mismodeling. Second, reprojection can be used in iterative reconstruction algorithms. For these algorithms, the reconstruction process is done via iteration, involving a number of computationally intensive steps, generally dominated by reprojection and backprojection. These iterations require substantial computing resources, including hardware allocation and processing time, and are therefore expensive. Thus, fast methods for backprojection need to be coupled with fast methods for reprojection to provide an overall speedup in such methods.

Accordingly, one object of this invention is to provide new and improved methods for imaging.

Another object is to provide methods for reprojection which provide an overall speedup and reduction of computational cost.

SUMMARY OF THE INVENTION

In keeping with one aspect of this invention, a method for reprojecting sinograms includes the steps of dividing a two-dimensional image into sub-images as small as on pixel, and reprojecting the sub-images at a smaller number of orientations to form subsinograms. These sub-sinograms are then successively aggregated and processed to form a full sinogram.

The method uses two algorithms to aggregate the sub-sinograms. In one algorithm, aggregation is exact, and in the other algorithm, aggregation is an approximation. The first algorithm is accurate, but relatively slow, and the second algorithm is faster, but less accurate. By performing some aggregations with the exact algorithm and some aggregations with the approximate algorithm, switching between the two algorithms in any of a number of suitable ways, an accurate result can be obtained quickly.

BRIEF DESCRIPTION OF THE DRAWINGS

These and other features and advantages of the invention will be apparent to those skilled in the art with reference to the detailed description and the drawings, of which.

DETAILED DESCRIPTION OF THE INVENTION

Figure 1:
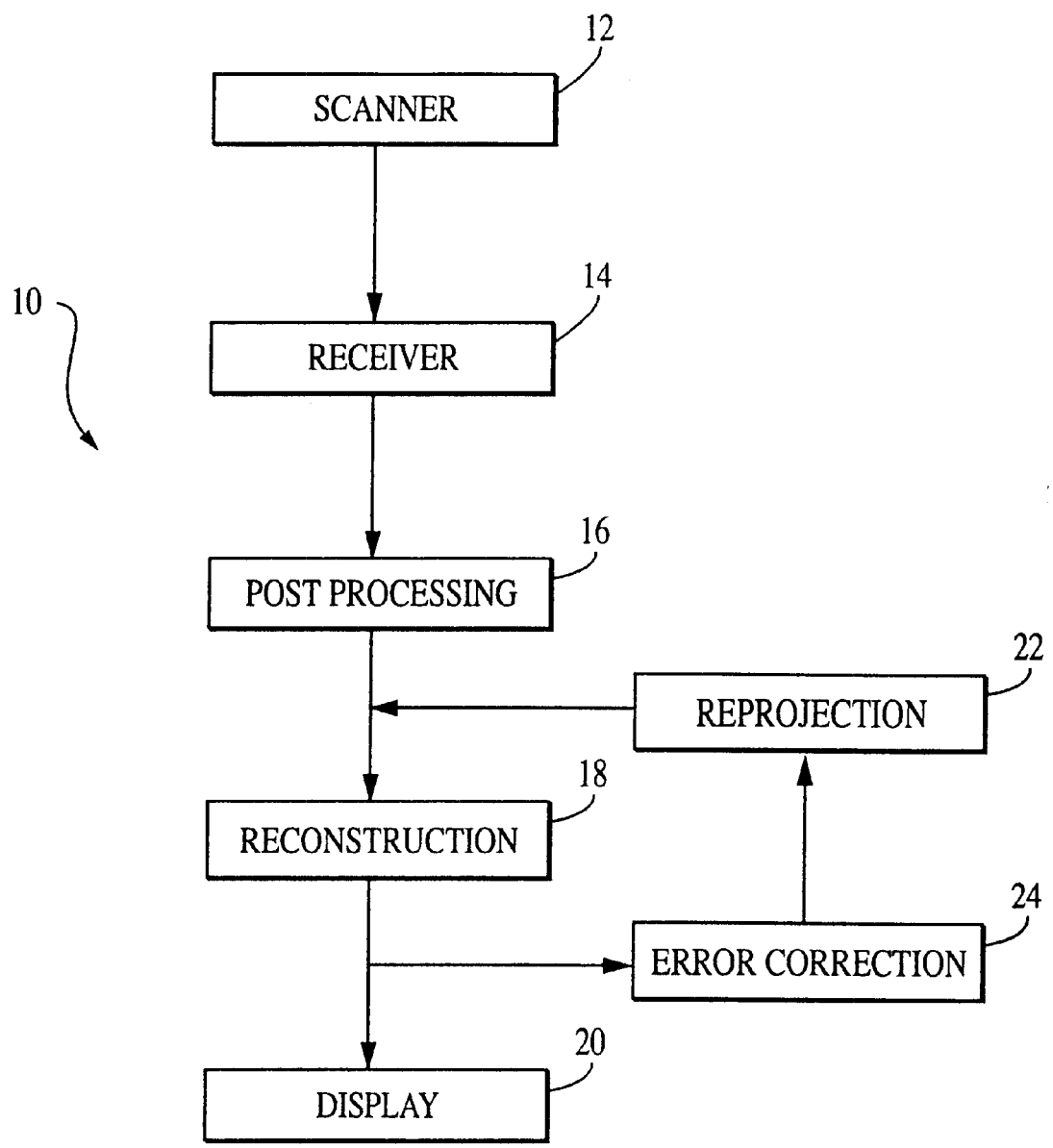
FIG. 1 is a block diagram of apparatus used in the present invention.

Imaging apparatus 10 made in accordance with the principles of this invention is shown in FIG. 1. The imaging apparatus 10 could be a CT scanner or a variety of other imaging devices. The imaging apparatus 10 includes a scanner 12, which generates raw data from an object such as a head. The data is sent to a receiver 14, and then to a post-processing apparatus (or Step) 16. Processing such as re-binning can be performed in the post-processing apparatus 16. The output of the post-processing apparatus 16 is reconstructed in apparatus (or Step) 18 and the resulting image is displayed in display apparatus 20. However, if the image has artifacts (due to e.g., a piece of metal in a head), the resulting errors can be removed by feeding the image to error correction apparatus (or Step) 24 and reprojection apparatus (or Step) 22, as will be described. The sinogram output after reprojection is fed to the input of the reconstruction apparatus (or Step) 18. Reprojection and error correction are repeated until the errors caused by the artifact are corrected.

In addition to artifact correction, the apparatus 10 can be used with iterative reconstruction algorithms. These algorithms permit reconstruction in the presence of missing or very noisy data, and allow for flexibility in the reconstruction process. In achieving this flexibility, however, iterative reconstruction techniques require a number of iterations, in which a candidate reconstruction is reprojected and back-projected successively. Thus, another need for the algorithm is in the acceleration of iterative reconstruction.

The input to the reprojection method is an image (2D array of numbers). From this, the reprojection method computes projections, which are collections of line integrals through of a continuous image represented by the array. The resulting 2D array of projection data is called a sinogram. One method for reprojecting images into sinograms is shown in FIG. 2.

Figure 2:
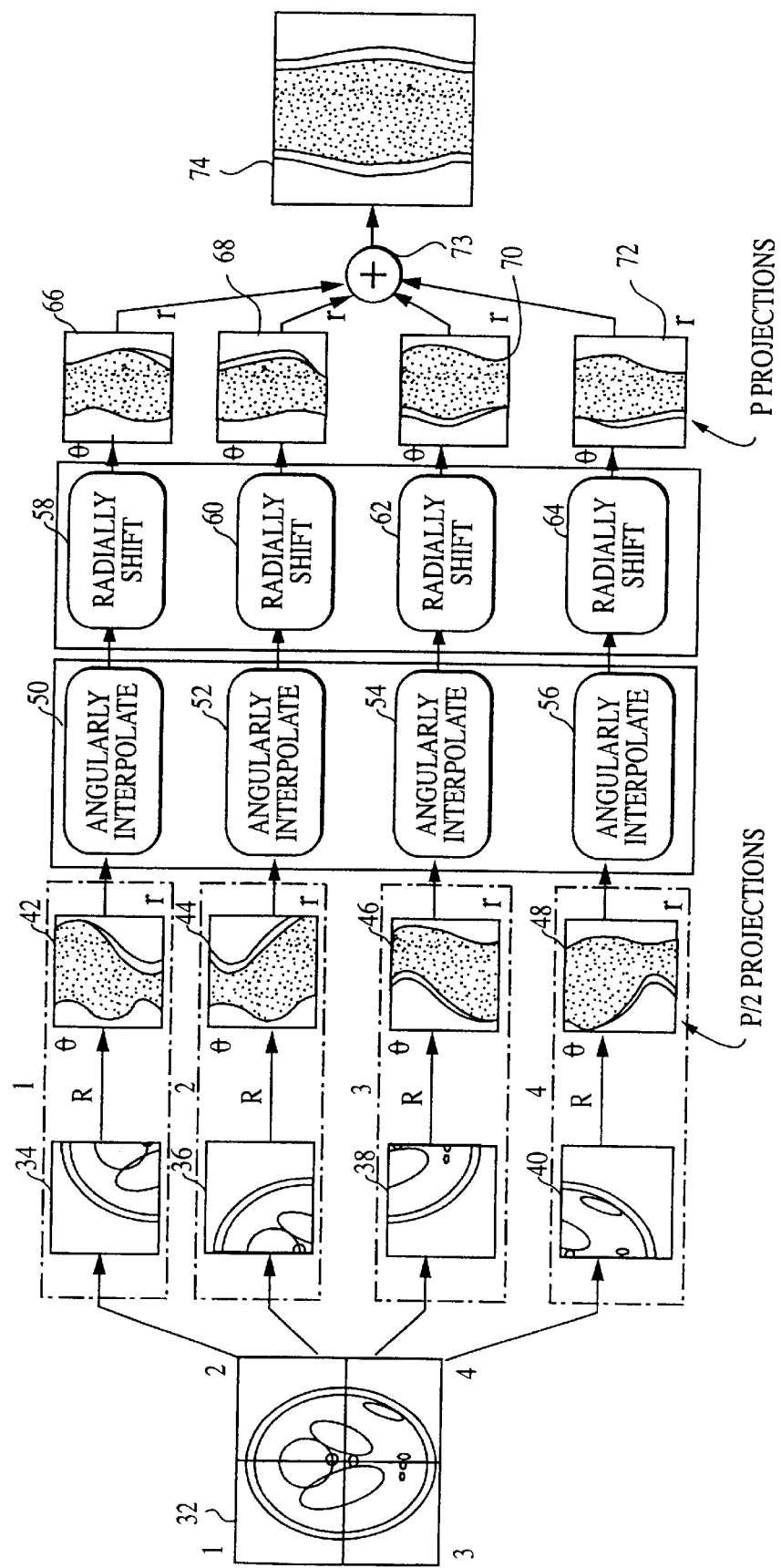
FIG. 2 is a diagram of a decomposition utilizing an approximate aggregation.

In FIG. 2, an image 32 is divided into sub-images 34, 36, 38, 40. These sub-images are reprojected at a smaller number of orientations to form subsinograms 42, 44, 46, 48, respectively. The subsinograms 42, 44, 46, 48 are angularly interpolated (Steps 50, 52, 54, 56) and are radially shifted (Steps 58, 60, 62, 64) to increase the number of orientations. The resulting sinograms 66, 68, 70, 72 are aggregated to form a full sinogram 74.

The decomposition just described is applied recursively, by processing each of the subsinograms 34, 36, 38, 40 through the entire process (Steps 32 . . . 74), and repeating the Steps until the sub-images are as small as one pixel each.

The sinogram computed using the method shown in FIG. 2 is not an exact 3 reprojection of the image, but rather a close approximation. However, the overall process is much faster than computing the reprojection using known methods. In fact, for reprojection of an N×N image at N views, the method shown in FIG. 2 is N/log$_2$N times faster than direct techniques.

Figure 3:
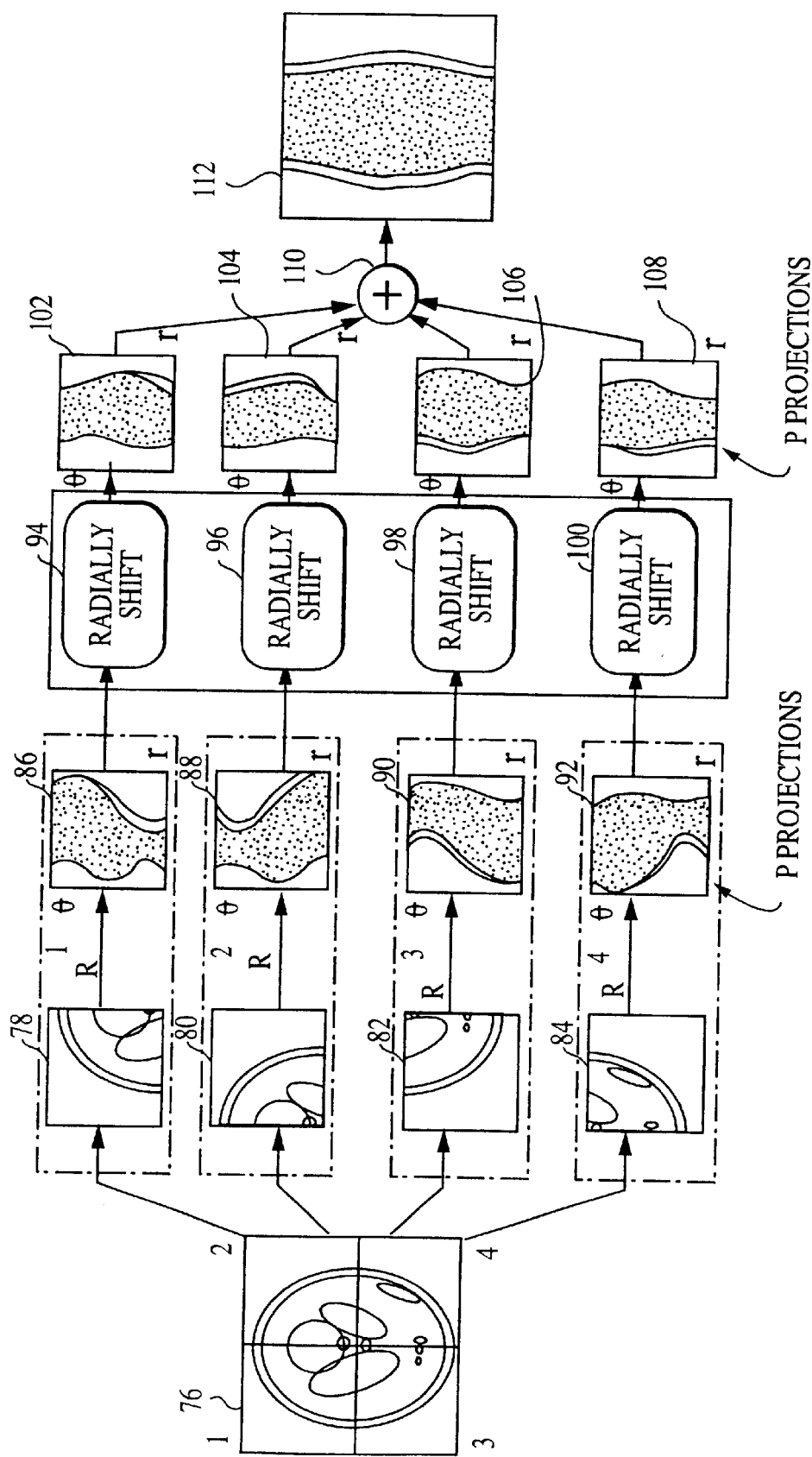
FIG. 3 is a diagram of a decomposition utilizing an exact aggregation.

A sinogram of an entire image computed using the method of FIG. 2 would not be as accurate as possible. To obtain a more accurate result, the method shown in FIG. 3 is also used. In the method or algorithm shown in FIG. 3, an image 76 is divided into a plurality of sub-images 78, 80, 82, 84. The subimages are reprojected into sinograms 86, 88, 90, 92, respectively, and the subimages are radially shifted (Steps 94, 96, 98, 100) into subsinograms 102, 104, 106, 108. Those subsinograms are added (Step 110) to form a sinogram 112. The algorithm is applied recursively, as with the algorithm of FIG. 2.

A comparison of the methods of FIGS. 2 and 3 reveals that FIG. 3 does not have an angular interpolation step (Steps 50, 52, 54, 56), but the reprojections of the subimages (steps 86, 88, 90, 92) are at twice the number of projections (compare steps 42, 44, 46, 48 in FIG. 2). As a result, reprojections computed using the process of FIG. 3 in Steps 102, 104, 106, 108 are exact, and there are no approximations involved, unlike Steps 66, 68, 70 and 72 in FIG. 2. This improves the accuracy, but it is a slow technique.

In this invention, the two processes of FIGS. 2 and 3 are combined using approximate aggregation and exact aggregation at different stages in the overall algorithm, so as to control processing costs and accuracy of the reconstruction as desired. The overall process is described by the following steps.

The image 22 (or 76) is divided into subimages (Steps 34 . . . 40 or 78 . . . 84). The subimages are reprojected (Steps 42, 44, 46, 48 or 86, 88, 90, 92) into sinograms at a smaller number of orientations. These subsinograms are aggregated using either the exact process of FIG. 3 (Steps 94, 96, 98 . . . 112) which is slower but accurate, or the approximate process of FIG. 2 (Steps 50, 52, 54 . . . 74), which is faster, but less accurate.

By controlling the number of times, and the circumstances under which the various aggregation techniques are used, the precision of the resulting algorithm can be controlled, without incurring the penalty on memory usage or performance that known methods potentially suffer from.

To construct the two decompositions, we first introduce a formulation of the reprojection operation. Assume that a discrete image $f$ is interpolated using an interpolation kernel b as $$f_c(x, y) = \sum_i \sum_j f(i, j) b(x - i, y - j). \quad (1)$$

The interpolation kernel b may be a circular or square pixel, tensor splines, cardinal splines, etc. The choice of b is based upon the assumed smoothness of the underlying image. The interpolated image is then reprojected according to $$g_c(r, p) = \int_t f_c(r\cos\theta_p - t\sin\theta_p, r\sin\theta_p + t\cos\theta_p) dt, \quad (2)$$

where $\theta_p$ are the view angles, and r is the continuous coordinate that indexes the projections. The continuous projections are then sampled using a detector response $\phi$ according to $$g(k,p) = \int_\tau \phi((k+\tau_p)T - \tau) g_c(\tau, p) d\tau \quad (3)$$

where k is an integer, $p \in \{0, \ldots, P-1\}$, $\tau_p \in [-0.5, \ldots 5]$. This allows us to model integrating detectors or pointwise sampling, as necessary. Combining formulas (1), (2) and (3) yields a fully discretized reprojection formula:

$$g(k, p) = \sum_i \sum_j f(i, j) \int_r \int_t \phi((k + \tau_p)T - r) \cdot \quad (4)$$
$$b(r\cos\theta_p - t\sin\theta_p - i, r\sin\theta_p + t\cos\theta_p - j) dt dr.$$

$$b(r \cos \theta_p - t \sin \theta_p - i, r \sin \theta_p + t \cos \theta_p - j) dt dr \quad (4)$$

The present invention is an efficient means to evaluate formula (4). For convenience, we will rewrite formula (4) as $$g(k, p) = \sum_{|i| \leq N/2} \sum_{|j| \leq N/2} f(i, j) \rho(T(k + \tau_p) - i\cos\theta_p - j\sin\theta_p, p), \quad (5)$$

where $$\rho(\tau, p) = \int \int \phi(\tau - x \cos \theta_p - y \sin \theta_p) b(x, y) dx dy. \quad (6)$$

From formula (4), we can construct both the approximate decomposition of FIG. 2, and the exact decomposition of FIG. 3. Referring first to FIG. 3, let $f_1$ denote the lth quadrant of $f$ (Step 76) centered at the origin (Steps 78 . . . 84):

$$f_l(i, j) = f(i - \delta_l(1), j - \delta_l(2)), \quad |i| \leq \frac{N}{4}, |j| \leq \frac{N}{4}, \quad (7)$$

where the $\delta_1$ are chosen appropriately. Now, $f_1$ is reprojected (Steps 86 . . . 92) via $$g_l(k, p) = \sum_{|i| \leq N/4} \sum_{|j| \leq N/4} f_l(i, j) \rho(T(k + v_l(p)) - i\cos\theta_p - j\sin\theta_p, p), \quad (8)$$

where $$v_l(p) = \left\langle \tau(p) - \frac{\delta_l(1)\cos\theta_p + \delta_l(2)\sin\theta_p}{T} \right\rangle \quad (9)$$

and <x> is x−[x], where [x] is the integer nearest x. With formula (8), the reprojection of $f$ is computed (Steps 94 . . . 110) as $$g(k, p) = \sum_{l=1}^{4} g_l(k + s_l(p), p), \quad (10)$$

where $$s_l(p) = \left[\tau(p) - \frac{\delta_l(1)\cos\theta_p + \delta_l(2)\sin\theta_p}{T}\right]. \quad (11)$$

This completes the description of the exact decomposition of FIG. 3.

The approximate decomposition is depicted in FIG. 2, and differs in the addition of the angular processing steps. Again, let $f_1$ denote that lth quadrant of $f$ (Steps 34 ... 40). Next, let $\tilde{g}_1(k,p)$ $$\tilde{g}_l(k, p) = \sum_{|i| \leq N/4} \sum_{|j| \leq N/4} f_l(i, j)\rho(T(k + v_l(2p)) - i\cos\theta_{2p} - j\sin\theta_{2p}, 2p). \quad (12)$$

Next, an inexpensive upsampling step (Steps 50 ... 56) is used to compute $g_1(k,p)$ from $\tilde{g}(k,p)$ by, e.g.

$$g_l(k, p) = \sum_{m} \sum_{n} \alpha(k, p, m, n)\tilde{g}_l(m, n) \quad (13)$$

where $\alpha$ (k, p, m, n) is an appropriately chosen interpolation/upsampling kernel. Once formula (13) has been applied, the combination step proceeds via formula (1) (Steps 58. . . 72).

As in known methods, the decomposition can be applied recursively, reapplying the process of either FIG. 2 or FIG. 3 to formulas (8) or (12) as necessary.

Finally, the overall accuracy of the process can be improved by computing projections on a radially denser set of samples than required, and then decimating the data to the required radial rate.

Experiments using the overall algorithm have proven successful. Computer codes in the MATLAB programming language and the C programming language were written to implement some of the processes described. In particular, successful simulations were performed in which the proposed process were used along with the processes described in U.S. patent application Ser. Nos. 09/419,415, filed Oct. 15, 1999, and Ser. No. 09/338,092, Filed Jun. 23, 1999, in the general configuration of FIG. 1.

Some simple experiments have been done comparing the proposed process to the Multilevel Domain Decomposition (MDD) method described in Ser. Nos. 09/419,415, filed Oct. 15, 1999, and Ser. No. 09/338,092, filed Jun. 23, 1999, as well. Experiments were performed comparing the proposed process with the known method for computation of P=768 projections on $[0,\pi]$ from a discrete N=256 sized Shepp-Logan Head phantom. The detector spacing was set to T=1.0.

The image was reprojected using direct reprojection (see equation No. 4). The resulting sinogram was taken as a baseline for comparison. The performance of the proposed process and of the MDD method was measured in term of % RMS error relative to this sinogram. The reprojection was also timed. The speedup of the MDD method and the proposed process were also measured relative to this time.

A different sinogram was generated by applying the MDD method to reproject the same phantom. The cost for the MDD method was controlled by changing the amount of radial oversampling that was used, with no angular oversampling. This sinogram was then compared to that computed via direct reprojection to determine the accuracy, and CPU time was used to determine the speedup.

A different sinogram was generated by applying the process of this invention to reproject the same phantom. The cost for the present invention was controlled by varying the amount of radial oversampling, and also the number of times that the exact versus approximate decomposition was used.

All other relevant parameters for the known methods and the present invention were chosen to be the same. In particular, linear interpolation was used for all radial operations, and the angular filter was set to [0.5, 1, 0.5]'. The basis functions b were chosen to be circular pixels.

Figure 4:
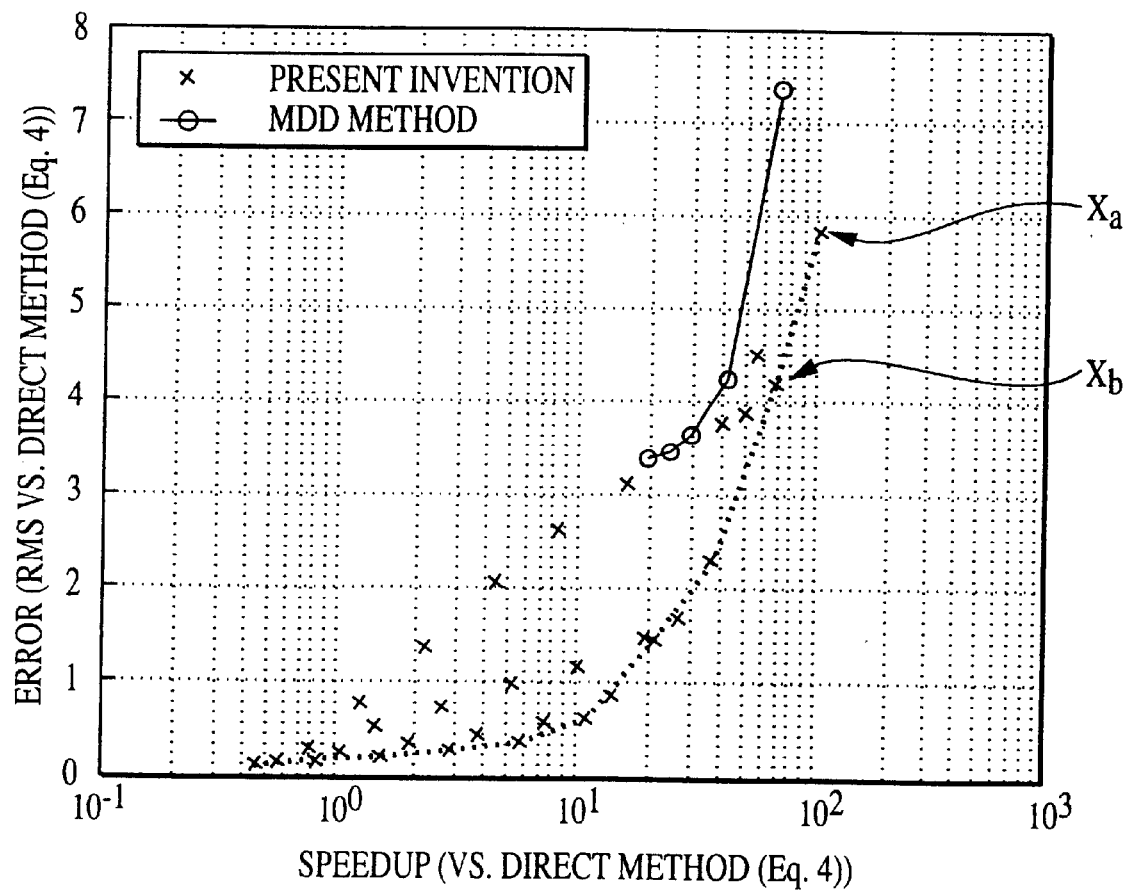
FIG. 4 is a graph showing experimental results obtained by the present invention, compared with a known process.

The results of these experiments are shown in FIG. 4. Note that the present process contains many more operating points, and is thus more flexible, than the MDD method (which is shown only for radial oversampling factors of 1, 2, 3 4). For example, operating point $X_a$ corresponds to only the approximate aggregation algorithm being used, and operating point $X_b$ corresponds to the exact aggregation algorithm being used at one stage of the process, and the approximate aggregation step being used for the remaining stages of the algorithm. Although the MDD method could be extended to other oversampling factors (including noninteger factors), these noninteger factors would most likely provide operating points close to those already achieved. The errors for the MDD method are higher than those expected in the process described in Ser. No. 09/419,415, filed Oct. 15, 1999. This is most likely due to the difference in phantoms used, and the use of a less smooth basis function b.

Another advantage of the present method is that it is more accurate than the MDD method. Hence, for a given speedup, and fixed interpolators, the present process consistently outperforms the MDD method, as is shown in FIG. 4. Finally, for applications requiring extremely high-precision reprojection, modest speedups can still be obtained using the present process.

Visual comparisons of images made by the present process were compared with images made with known processes using data from the Visual Human Dataset (VHD), which is a database available through the National Library of Medicine in Bethesda, Md. A N=512 pixel CT scan of a human female, reprojected at P=1024 views with T=1.0 using direct reprojection. The resulting data were then reconstructed using standard techniques. The experiments suggest that the proposed process can duplicate the results of the MDD method at significant speedups for images of practical size.

As described, the invention is fairly general, and covers 2D and 3D tomographic data acquisition geometries of practical interest. Standard computational techniques can be applied to rearrange the proposed process structure. It can also be implemented in hardware, software, or any combination thereof However, the defining idea of the hierarchical decomposition and the resulting recursive algorithm structure are not affected by these changes. With varying degrees of computational efficiency, the algorithm can be implemented for another radix or for an arbitrary factorization of N.

The many advantages of this invention are now apparent. Tomographic data can be manipulated with greater flexibility and accuracy in the implementation of reprojection algorithm. Overall, reprojection is faster and less costly.

While the principles of the invention have been described above in connection with a specific apparatus and applications, it is to be understood that this description is made only by way of example and not as a limitation on the scope of the invention.

What is claimed is:

1. A computational process for generating a sinogram by reprojecting an electronic image comprising the steps of:

dividing the image into a plurality of sub-images;

reprojecting said sub-images by computing sub-sinograms of each of said sub-images; and aggregating results of the sub-image reprojecting step to create the sinogram, wherein said aggregating steps include a number of exact aggregations and a number of approximate aggregations.

2. The process of claim 1 wherein said aggregations are performed in a recursive manner.

3. The process of claim 1 wherein said exact aggregations are performed by radially shifting said sub-sinograms to produce shifted sub-sinograms and adding said shifted sub-sinograms.

4. The process of claim 1 wherein said approximate aggregations are performed by angularly interpolating, radially shifting, and adding said sub-sinograms as interpolated and shifted.

5. Apparatus for creating an image of an object comprising:

a scanner which generates data from the object;

a processor for creating at least one projection of the object;

means for reconstructing the image from the at least one projection;

means for detecting errors in the image produced by the reconstruction means;

means for reprojecting the image after error correction and feeding the corrected image to said reconstruction means; and means for displaying the image created by the reconstruction means after the errors are corrected, wherein said reprojecting means divides the image into a plurality of sub-images, reprojects said sub-images into sub-image sinograms and aggregates said sub-image sinograms to obtain the image sinogram by performing a number of exact aggregations and a number of approximate aggregations.

6. The apparatus of claim 5 wherein said aggregations are performed in a recursive manner.

7. The apparatus of claim 5 wherein said exact aggregations are performed by radially shifting and adding said sub-sinograms.

8. The apparatus of claim 5 wherein said approximate aggregations are performed by angularly interpolating, radially shifting, and adding said sub-sinograms.

9. The process of claim 3 wherein said subdivisions of the image are performed in a recursive manner.

10. The process of claim 4 wherein said subdivisions of the image are performed in a recursive manner.

11. The process of any claims 1, 2, 3, or 4 wherein said subdivisions are performed in a recursive manner, until the subimages have a desired size, as small as one pixel.

12. The process of any of claims 3 or 4 wherein said radial shifts involve interpolation.

13. The process of claim 12 wherein said interpolations have different accuracies.

14. The processes of any claims 3 or 4 wherein at least one of the steps is performed by special-purpose hardware.

15. The apparatus of any of claims 7 or 8 wherein said reprojecting means divides the sub-images in a recursive manner.

16. The apparatus of any of claims 5, 7, or 8 wherein said subdivisions are performed in a recursive manner, until the subimages have a desired size, as small as one pixel.

17. The apparatus of any of claims 7 or 8 wherein said radial shifts involve interpolation.

18. The apparatus of claim 17 wherein said interpolations have different accuracies.

19. The apparatus of any of claims 5 to 8 comprising at least some special purpose hardware.

* * * * *

UNITED STATES PATENT AND TRADEMARK OFFICE
CERTIFICATE OF CORRECTION

PATENT NO. : 6,351,548 B1
DATED : February 26, 2002
INVENTOR(S) : Basu et al.

It is certified that error appears in the above-identified patent and that said Letters Patent is hereby corrected as shown below:

Column 1,
Between the title and line 1, insert the following: -- This invention was made with Government support under Contract No. CCR99-72980 awarded by the National Science Foundation. The Government has certain rights in this invention. --

Signed and Sealed this

Fourth Day of June, 2002

*Attest:*

*Attesting Officer*

JAMES E. ROGAN
*Director of the United States Patent and Trademark Office*